United States Patent

[11] 3,582,667

| [72] | Inventor | Howard A. Mayo, Jr.<br>York, Pa. |
|---|---|---|
| [21] | Appl. No. | 768,443 |
| [22] | Filed | Oct. 17, 1968 |
| [45] | Patented | June 1, 1971 |
| [73] | Assignee | Allis-Chalmers Manufacturing Company<br>Milwaukee, Wis. |

[54] METHOD OF STARTING HYDRAULIC TURBINE GENERATORS
5 Claims, 1 Drawing Fig.

[52] U.S. Cl.................................................... 290/52,
415/209, 415/148, 307/86
[51] Int. Cl...................................................... H02p 9/04
[50] Field of Search.......................................... 290/52, 1;
415/148, 149, 150, 209; 307/85, 86, 87

[56] References Cited
UNITED STATES PATENTS

| 2,797,858 | 7/1957 | Vondernwell | 415/148 |
| 1,978,809 | 10/1934 | Moody | 415/149 |
| 2,815,188 | 12/1957 | Nelson | 415/148X |
| 3,285,567 | 11/1966 | Richardson | 415/148 |
| 3,405,278 | 10/1968 | Ley | 415/150X |

*Primary Examiner*—G. R. Simmons
*Attorneys*—John P. Hines, Robert B. Benson and Thomas F. Kirby

ABSTRACT: The method of starting a hydraulic turbine generator with a valve located in the draft tube of the turbine.

PATENTED JUN 1 1971 3,582,667
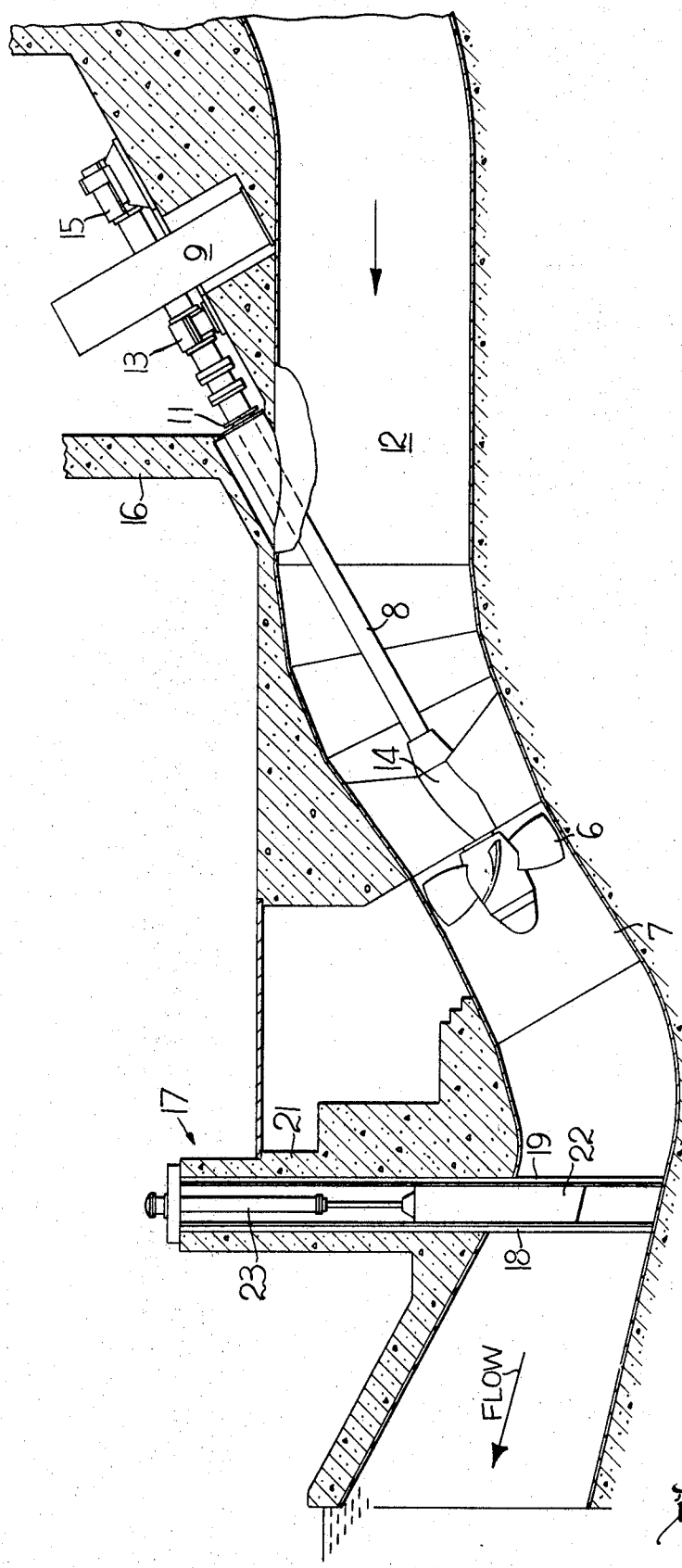
Inventor
Howard A. Mayo
By John B Hines
Attorney

METHOD OF STARTING HYDRAULIC TURBINE GENERATORS

This invention pertains in general to hydraulic turbines and more particularly to a method of starting the turbine generator by means of a valve in the turbine draft tube.

In hydraulic installations it is necessary to provide means to start and bring the generator up to synchronous speed. In prior-art installations, the turbine speed has been controlled by wicket gates, inlet valves, or on four-bladed units, by adjusting the position of the blades. Adjustable blade turbines with more than four blades or with very long blades may have such a high minimum blade angle that the turbine generator cannot be synchronized without the addition of wicket gates or an inlet valve. Each of these previously used methods of starting and speed control adds considerably to the cost of the machine.

It is the intention and general object of this invention to provide an inexpensive method of starting and synchronizing a hydraulic turbine generator.

A more specific object of the subject invention is to provide a method of starting a hydraulic turbine which includes the use of a valve in the turbine draft tube.

These and other objects of the subject invention will become more fully apparent as the following description is read in light of the attached drawing which shows a side elevation of a turbine generator installation incorporating the invention.

The invention is shown herein for purposes of illustration in connection with a substantially horizontally disposed turbine generator installation. The turbine runner 6 is shown herein as being of the propeller type and is supported for rotation in the draft tube 7. A drive shaft 8 connected to the runner for rotation therewith is inclined upwardly in the upstream direction and is connected to a generator generally designated 9. A conventional water seal is provided at 11 to seal the water in the penstock 12 from the atmosphere.

Rotating weight and hydraulic thrust acting on the turbine runner 6 is transmitted through shaft 8 supported on journal bearings 13 and 14 to a combination thrust and journal bearing 15. The generator 9 is usually located in a powerhouse, one wall of which is indicated at 16.

A valve herein shown for purposes of illustration as a conventional gate valve 17 is located in the draft tube on the downstream side of the runner 6. The gate valve 17 may be of any conventional construction and is herein shown as comprising guide walls 18 and 19 which extend into the draft tube 7 and upward into a portion 21 of the hydraulic installation foundation. The gate 22 of the valve is of a configuration to block the flow of water through the draft tube 7 when it is in the fully lowered position. Any means of a conventional nature may be provided to operate the gate and as herein shown for purposes of illustration, a hydraulic servomotor 23 is connected to the upper portion of the gate. This servomotor is activated to raise and lower the gate 22 and control the flow of fluid through the runner 6 thereby controlling the speed of the turbine.

When the generator 9 is off the line the gate 22 will be in the fully closed position. When it is desired to put the generator on line the gate is slowly raised permitting water to flow through the draft tube causing the runner 6 to rotate. The gate is progressively raised increasing the speed of the runner until the generator has reached synchronous speed. The generator is then put on line and the gate is then fully raised.

From the above description it can be seen that a very inexpensive means has been provided for starting a hydraulic turbine. With this arrangement the expensive wicket gates, inlet valve and blade control mechanism are not necessary.

The embodiments of the invention in which I claim an exclusive property or privilege are defined as follows:

1. The method of starting a hydraulic turbine generator with a valve located in the turbine draft tube downstream from the runner comprising the steps of: partially opening said draft tube valve to permit water to flow through said draft tube and cause rotation of said runner; continuing to open said draft tube valve until the turbine generator has reached synchronous speed; putting said generator on line; and completely opening said valve.

2. The method set forth in claim 1 wherein said turbine is of the propeller type.

3. The method set forth in claim 1 wherein said draft tube valve is a gate valve.

4. The method as set forth in claim 1 wherein said turbine runner is located below the level of the turbine tailwater.

5. The method set forth in claim 1 wherein said draft tube gate is located below the level of the turbine tailwater.